US012701237B2

(12) United States Patent
Wieckowski et al.

(10) Patent No.: US 12,701,237 B2
(45) Date of Patent: Aug. 4, 2026

(54) ENCODER AND DECODER, ENCODING METHOD AND DECODING METHOD WITH PROFILE AND LEVEL DEPENDENT CODING OPTIONS

(71) Applicant: FRAUNHOFER-GESELLSCHAFT ZUR FÖRDERUNG DER ANGEWANDTEN FORSCHUNG E.V., Munich (DE)

(72) Inventors: Adam Wieckowski, Berlin (DE); Robert Skupin, Berlin (DE); Yago Sánchez De La Fuente, Berlin (DE); Cornelius Hellge, Berlin (DE); Thomas Schierl, Berlin (DE); Detlev Marpe, Berlin (DE); Karsten Sühring, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 19/039,960

(22) Filed: Jan. 29, 2025

(65) Prior Publication Data

US 2025/0175612 A1 May 29, 2025

Related U.S. Application Data

(60) Division of application No. 17/465,007, filed on Sep. 2, 2021, now Pat. No. 12,244,816, which is a
(Continued)

(30) Foreign Application Priority Data

Mar. 11, 2019 (EP) ..................................... 19162052

(51) Int. Cl.
| | | |
|---|---|---|
| *H04N 19/137* | (2014.01) | |
| *H04N 19/176* | (2014.01) | |
(Continued)

(52) U.S. Cl.
CPC ......... *H04N 19/137* (2014.11); *H04N 19/176* (2014.11); *H04N 19/186* (2014.11); *H04N 19/189* (2014.11)

(58) Field of Classification Search
CPC .. H04N 19/137; H04N 19/176; H04N 19/186; H04N 19/189; H04N 19/117;
(Continued)

(56) References Cited

U.S. PATENT DOCUMENTS

| | | |
|---|---|---|
| 9,191,682 B2 | 11/2015 | Margerm |
| 9,467,713 B2 | 10/2016 | Oh |
(Continued)

FOREIGN PATENT DOCUMENTS

| | | |
|---|---|---|
| JP | 2011-077761 | 4/2011 |
| JP | 2018-530237 | 10/2018 |
(Continued)

OTHER PUBLICATIONS

Bross, et al., "Versatile Video Coding (Draft 3)", Joint Video Experts Team (JVET) of ITU-T SG 16 WP 3 and ISO/IEC JTC 1/SC 29/WVG 11, JVET-L1001-v7, 12th Meeting: Macao, CN, Oct. 3-12, 2018, 223 pages.
(Continued)

*Primary Examiner* — Jared Walker
(74) *Attorney, Agent, or Firm* — Sage Patent Group

(57) ABSTRACT

A video encoder according to embodiments is provided. The video encoder is configured for encoding a plurality of pictures of a video by generating an encoded video signal, wherein each of the plurality of pictures includes original picture data. The video encoder includes a data encoder
(Continued)

101 configured for generating the encoded video signal including encoded picture data, wherein the data encoder is configured to encode the plurality of pictures of the video into the encoded picture data. Moreover, the video encoder includes an output interface configured for outputting the encoded picture data of each of the plurality of pictures. Furthermore, a video decoders, systems, methods for encoding and decoding, computer programs and encoded video signals according to embodiments are provided.

12 Claims, 11 Drawing Sheets

Related U.S. Application Data continuation of application No. PCT/EP2020/056355, filed on Mar. 10, 2020.

(51) Int. Cl.
| | | |
|---|---|---|
| *H04N 19/186* | (2014.01) | |
| *H04N 19/189* | (2014.01) | |

(58) Field of Classification Search
CPC .... H04N 19/136; H04N 19/172; H04N 19/43; H04N 19/46; H04N 19/54; H04N 19/563; H04N 19/59; H04N 19/70; H04N 19/82; H04N 19/597; H04N 19/527
See application file for complete search history.

(56) References Cited

U.S. PATENT DOCUMENTS

| | | | |
|---|---|---|---|
| 9,602,827 | B2 | 3/2017 | Chen et al. |
| 11,470,351 | B2 | 10/2022 | Yu |
| 2005/0053294 | A1 | 3/2005 | Mukerjee et al. |
| 2005/0053295 | A1 | 3/2005 | Holcomb |
| 2010/0046612 | A1 | 2/2010 | Sun et al. |
| 2015/0156499 | A1 | 6/2015 | Nakamura |
| 2016/0057420 | A1 | 2/2016 | Pang |
| 2016/0100189 | A1 | 4/2016 | Pang |
| 2016/0105670 | A1 | 4/2016 | Pang |
| 2016/0165254 | A1 | 6/2016 | Lee |
| 2017/0085897 | A1 | 3/2017 | Narasimhan et al. |
| 2017/0085917 | A1 | 3/2017 | Hannuksela |
| 2017/0195680 | A1 | 7/2017 | Yamamoto |
| 2020/0275118 | A1 | 8/2020 | Wang |
| 2020/0296382 | A1 | 9/2020 | Zhao |
| 2020/0366933 | A1 | 11/2020 | Zhang |
| 2021/0211710 | A1 | 7/2021 | Zhang |
| 2021/0321111 | A1 | 10/2021 | Tamse |
| 2021/0409718 | A1 | 12/2021 | Wieckowski |

FOREIGN PATENT DOCUMENTS

| | | |
|---|---|---|
| KR | 10-2015-0024934 | 3/2015 |
| WO | 2005027497 A2 | 3/2005 |
| WO | 2011/040302 | 4/2011 |
| WO | 2018/170279 | 9/2018 |
| WO | 2020/142360 | 7/2020 |
| WO | 2020/169114 | 8/2020 |

OTHER PUBLICATIONS

Tamse, et al., "CE2-related: MV Derivation for Affine Chroma", Joint Video Experts Team (JVET) of ITU-T SG 16 WP 3 and ISO/IEC JTC 1/SC 29/WG 11, JVET-M0192-v1, 13th Meeting: Marrakech, MA, Jan. 9-18, 2019, 5 pages.

International Search Report and Written Opinion dated Jul. 15, 2020, issued in application No. PCT/EP2020/056355.

ISO/IEC, ITU-T. "High efficiency Video coding. ITU-T Recommendation H.265 | ISO/IEC 23008 10 (HEVC);" edition 1; Apr. 2013; pp. 1-317.

ISO/IEC, ITU-T. "High efficiency Video coding. ITU-T Recommendation H.265 | ISO/IEC 23008 10 (HEVC);" edition 2; Oct. 2014; pp. 1-540.

Bross, B. et al,; "Versatile Video Coding (Draft 4);" Joint Video Experts Team (JVET) of ITU-T SG 16 WP 3 and ISO/IEC JTC 1/SC 29/WG 11; Jan. 2019; pp. 1-299.

Bross, B. et al,; "Versatile Video Coding (Draft 4);" Joint Video Experts Team (JVET) of ITU-T SG 16 WP 3 and ISO/IEC JTC 1/SC 29/WG 11; Jan. 2019; pp. 1-294.

Hanhart, P., et al.; "CE13: PERP with horizontal geometry padding of reference pictures (Test 33);" Oct. 2018; URL:http://pheni x.i nt-evry.fr/jvet/doc_end; pp. 1-8.

Lin, J.L., et al.; "Efficient Projection and Coding Tools for 360° Video;" IEEE Journal on Emerging and Selected Topics in Circuits and Systems; vol. 9; No. 1; Mar. 2019; pp. 84-97.

He, Y., et al.; "Motion compensated prediction with geometry padding for 360 Video coding;" 2017 IEEE Visual Communications and Image Processings (VCIP), IEEE; Dec. 2017; pp. 1-4.

| ERP | High Res Tile 1 |
| | High Res Tile 2 |

| ERP | High Res Tile 1 | High Res Tile 3 |
| | | High Res Tile 4 |
| | High Res Tile 2 | |

Fig. 4

ENCODER AND DECODER, ENCODING METHOD AND DECODING METHOD WITH PROFILE AND LEVEL DEPENDENT CODING OPTIONS

CROSS-REFERENCES TO RELATED APPLICATIONS

This application is a divisional of U.S. application Ser. No. 17/465,007, filed Sep. 2, 2021, which is a continuation of International Application No. PCT/EP2020/056355, filed Mar. 10, 2020, which claims priority from European Application No. EP 19162052.5, filed Mar. 11, 2019, the entire contents of each of which are hereby incorporated by reference.

The present invention relates to video encoding and video decoding and, in particular, to an encoder and a decoder, to an encoding method and to a decoding method with profile and level dependent coding options.

BACKGROUND OF THE INVENTION

H.265/HEVC (HEVC=High Efficiency Video Coding) is a video codec which already provides tools for elevating or even enabling parallel processing at an encoder and/or at a decoder. For example, HEVC supports a sub-division of pictures into an array of tiles which are encoded independently from each other. Another concept supported by HEVC pertains to WPP, according to which CTU-rows or CTU-lines of the pictures may be processed in parallel from left to right, e.g. in stripes, provided that some minimum CTU offset is obeyed in the processing of consecutive CTU lines (CTU=coding tree unit). It would be favorable, however, to have a video codec at hand which supports parallel processing capabilities of video encoders and/or video decoders even more efficiently.

In the following, an introduction to VCL partitioning according to the state-of-the-art is described (VCL=video coding layer).

Typically, in video coding, a coding process of picture samples requires smaller partitions, where samples are divided into some rectangular areas for joint processing such as prediction or transform coding. Therefore, a picture is partitioned into blocks of a particular size that is constant during encoding of the video sequence. In H.264/AVC standard fixed-size blocks of 16×16 samples, so called macroblocks, are used (AVC=Advanced Video Coding).

In the state-of-the-art HEVC standard (see [1]), there are Coded Tree Blocks (CTB) or Coding Tree Units (CTU) of a maximum size of 64×64 samples. In the further description of HEVC, for such a kind of blocks, the more common term CTU is used.

CTUs are processed in raster scan order, starting with the top-left CTU, processing CTUs in the picture line-wise, down to the bottom-right CTU.

The coded CTU data is organized into a kind of container called slice. Originally, in former video coding standards, slice means a segment comprising one or more consecutive CTUs of a picture. Slices are employed for a segmentation of coded data. From another point of view, the complete picture can also be defined as one big segment and hence, historically, the term slice is still applied. Besides the coded picture samples, slices also comprise additional information related to the coding process of the slice itself which is placed into a so-called slice header.

According to the state-of-the-art, a VCL (video coding layer) also comprises techniques for fragmentation and spatial partitioning. Such partitioning may, e.g., be applied in video coding for various reasons, among which are processing load-balancing in parallelization, CTU size matching in network transmission, error-mitigation etc.

SUMMARY

An embodiment may have a video decoder for decoding an encoded video signal comprising encoded picture data to reconstruct a plurality of pictures of a video, wherein the video decoder comprises: an input interface configured for receiving the encoded video signal, and a data decoder configured for reconstructing the plurality of pictures of the video by decoding the encoded picture data, wherein the data decoder is configured to decode chroma format information encoded within the encoded video signal, wherein the data decoder is configured to determine motion information for a chroma subblock of a plurality of chroma subblocks from motion information of one or more of a plurality of luma subblocks depending on the chroma format information, wherein the data decoder is configured to reconstruct the plurality of pictures depending on the motion information of the one or more of the luma subblocks and depending on the motion information for the chroma sub-block.

Another embodiment may have a video encoder for encoding a plurality of pictures of a video by generating an encoded video signal, wherein each of the plurality of pictures comprises original picture data, wherein the video encoder comprises: a data encoder configured for generating the encoded video signal comprising encoded picture data, wherein the data encoder is configured to encode the plurality of pictures of the video into the encoded picture data, and an output interface configured for outputting the encoded picture data of each of the plurality of pictures, wherein the data encoder is configured to generate the encoded video signal such that the encoded video signal comprises an encoding of chroma format information and an encoding of motion information of one or more of a plurality of luma subblocks.

Another embodiment may have a method for decoding an encoded video signal comprising encoded picture data to reconstruct a plurality of pictures of a video, wherein the method comprises: for receiving the encoded video signal, and reconstructing the plurality of pictures of the video by decoding the encoded picture data, wherein reconstructing the plurality of pictures comprises decoding chroma format information encoded within the encoded video signal, wherein reconstructing the plurality of pictures comprises determining motion information for a chroma subblock of a plurality of chroma subblocks from motion information of one or more of a plurality of luma subblocks depending on the chroma format information, wherein reconstructing the plurality of pictures is conducted depending on the motion information of the one or more of the luma subblocks and depending on the motion information for the chroma sub-block.

Another embodiment may have a method for encoding a plurality of pictures of a video by generating an encoded video signal, wherein each of the plurality of pictures comprises original picture data, wherein the method comprises: generating the encoded video signal comprising encoded picture data, wherein generating the encoded video signal comprises encoding the plurality of pictures of the video into the encoded picture data, and outputting the encoded picture data of each of the plurality of pictures, wherein generating the encoded video signal is conducted such that the encoded video signal comprises an encoding of chroma format information and an encoding of motion information of one or more of a plurality of luma subblocks.

Another embodiment may have a non-transitory digital storage medium having a computer program stored thereon to perform the method for decoding an encoded video signal comprising encoded picture data to reconstruct a plurality of pictures of a video, wherein the method comprises: for receiving the encoded video signal, and reconstructing the plurality of pictures of the video by decoding the encoded picture data, wherein reconstructing the plurality of pictures comprises decoding chroma format information encoded within the encoded video signal, wherein reconstructing the plurality of pictures comprises determining motion information for a chroma subblock of a plurality of chroma subblocks from motion information of one or more of a plurality of luma subblocks depending on the chroma format information, wherein reconstructing the plurality of pictures is conducted depending on the motion information of the one or more of the luma subblocks and depending on the motion information for the chroma subblock, when said computer program is run by a computer.

Another embodiment may have a non-transitory digital storage medium having a computer program stored thereon to perform the method for encoding a plurality of pictures of a video by generating an encoded video signal, wherein each of the plurality of pictures comprises original picture data, wherein the method comprises: generating the encoded video signal comprising encoded picture data, wherein generating the encoded video signal comprises encoding the plurality of pictures of the video into the encoded picture data, and outputting the encoded picture data of each of the plurality of pictures, wherein generating the encoded video signal is conducted such that the encoded video signal comprises an encoding of chroma format information and an encoding of motion information of one or more of a plurality of luma subblocks, when said computer program is run by a computer.

Another embodiment may have an encoded video signal encoding a picture, wherein the encoded video signal comprises encoded picture data encoding the picture, wherein the encoded video signal further comprises an encoding of chroma format information and an encoding of motion information of one or more of a plurality of luma subblocks.

Another embodiment may have a system comprising: the inventive video encoder, and the video decoder for decoding an encoded video signal comprising encoded picture data to reconstruct a plurality of pictures of a video, wherein the video decoder comprises: an input interface configured for receiving the encoded video signal, and a data decoder configured for reconstructing the plurality of pictures of the video by decoding the encoded picture data, wherein the data decoder is configured to decode chroma format information encoded within the encoded video signal, wherein the data decoder is configured to determine motion information for a chroma subblock of a plurality of chroma subblocks from motion information of one or more of a plurality of luma subblocks depending on the chroma format information, wherein the data decoder is configured to reconstruct the plurality of pictures depending on the motion information of the one or more of the luma subblocks and depending on the motion information for the chroma subblock, wherein the video encoder configured to generate the encoded video signal, and wherein the video decoder is configured to decode the encoded video signal to reconstruct the picture of the video.

Another embodiment may have a video encoder for encoding a plurality of pictures of a video by generating an encoded video signal, wherein each of the plurality of pictures comprises original picture data, wherein the video encoder comprises: a data encoder configured for generating the encoded video signal comprising encoded picture data, wherein the data encoder is configured to encode the plurality of pictures of the video into the encoded picture data, and an output interface configured for outputting the encoded picture data of each of the plurality of pictures, wherein a video session comprises a plurality of coded video sequences, wherein a CVS profile of a plurality of video profiles is assigned to each coded video sequence of the plurality of coded video sequences, wherein the CVS profile of said coded video sequence defines one or more tools of a plurality of tools that are needed to decode said coded video sequence, wherein each of the plurality of video profiles defines at least one tool that is needed to decode at least one of the plurality of coded video sequences, wherein the data encoder is configured to determine a session profile for the video session depending on the CVS profiles of the plurality of coded video sequences of the video session, wherein the session profile defines at least one tool from the plurality of tools that is needed to decode the plurality of coded video sequences of the video session, wherein the data encoder is configured to generate the encoded video signal such that the encoded video signal comprises an encoding of an indication that indicates the session profile, wherein the data encoder is configured to determine the session profile from the plurality of video profiles such that the session profile comprises all tools of the plurality of tools that are needed to decode all coded video sequences of the video session.

Another embodiment may have a video decoder for decoding an encoded video signal comprising encoded picture data to reconstruct a plurality of pictures of a video, wherein the video decoder comprises: an input interface configured for receiving the encoded video signal, and a data decoder configured for reconstructing the plurality of pictures of the video by decoding the encoded picture data, wherein the data decoder is configured to decode from the encoded video signal a session profile for a video session comprising a plurality of coded video sequences, wherein each of a plurality of video profiles defines at least one tool from a plurality of tools that is needed to decode at least one of the plurality of coded video sequences, wherein the session profile defines at least one tool from the plurality of tools that is needed to decode the plurality of coded video sequences of the video session, wherein the data decoder is configured to reconstruct the plurality of pictures of the video depending on the session profile.

Another embodiment may have a method for encoding a plurality of pictures of a video by generating an encoded video signal, wherein each of the plurality of pictures comprises original picture data, wherein the method comprises: generating the encoded video signal comprising encoded picture data, wherein generating the encoded video signal comprises encoding the plurality of pictures of the video into the encoded picture data, and outputting the encoded picture data of each of the plurality of pictures, wherein a video session comprises a plurality of coded video sequences, wherein a CVS profile of a plurality of video profiles is assigned to each coded video sequence of the plurality of coded video sequences, wherein the CVS profile of said coded video sequence defines one or more tools of a plurality of tools that are needed to decode said coded video sequence, wherein each of the plurality of video profiles defines at least one tool that is needed to decode at least one of the plurality of coded video sequences, wherein the method comprises determining a session profile for the video session depending on the CVS profiles of the plurality of coded video sequences of the video session, wherein the session profile defines at least one tool from the plurality of tools that are needed to decode the plurality of coded video sequences of the video session, wherein generating the encoded video signal is conducted such that the encoded video signal comprises an encoding of an indication that indicates the session profile, wherein determining the session profile from the plurality of video profiles is conducted such that the session profile comprises all tools of the plurality of tools that are needed to decode all coded video sequences of the video session.

Another embodiment may have a method for decoding an encoded video signal comprising encoded picture data to reconstruct a plurality of pictures of a video, wherein the method comprises: for receiving the encoded video signal, and reconstructing the plurality of pictures of the video by decoding the encoded picture data, wherein the method comprises decoding from the encoded video signal a session profile for a video session comprising a plurality of coded video sequences, wherein each of a plurality of video profiles defines at least one tool from a plurality of tools that is needed to decode at least one of the plurality of coded video sequences, wherein the session profile defines at least one tool from the plurality of tools that is needed to decode the plurality of coded video sequences of the video session, wherein reconstructing the plurality of pictures of the video is conducted depending on the session profile.

Another embodiment may have a non-transitory digital storage medium having a computer program stored thereon to perform the method for encoding a plurality of pictures of a video by generating an encoded video signal, wherein each of the plurality of pictures comprises original picture data, wherein the method comprises: generating the encoded video signal comprising encoded picture data, wherein generating the encoded video signal comprises encoding the plurality of pictures of the video into the encoded picture data, and outputting the encoded picture data of each of the plurality of pictures, wherein a video session comprises a plurality of coded video sequences, wherein a CVS profile of a plurality of video profiles is assigned to each coded video sequence of the plurality of coded video sequences, wherein the CVS profile of said coded video sequence defines one or more tools of a plurality of tools that are needed to decode said coded video sequence, wherein each of the plurality of video profiles defines at least one tool that is needed to decode at least one of the plurality of coded video sequences, wherein the method comprises determining a session profile for the video session depending on the CVS profiles of the plurality of coded video sequences of the video session, wherein the session profile defines at least one tool from the plurality of tools that are needed to decode the plurality of coded video sequences of the video session, wherein generating the encoded video signal is conducted such that the encoded video signal comprises an encoding of an indication that indicates the session profile, wherein determining the session profile from the plurality of video profiles is conducted such that the session profile comprises all tools of the plurality of tools that are needed to decode all coded video sequences of the video session, when said computer program is run by a computer.

Another embodiment may have a non-transitory digital storage medium having a computer program stored thereon to perform the method for decoding an encoded video signal comprising encoded picture data to reconstruct a plurality of pictures of a video, wherein the method comprises: for receiving the encoded video signal, and reconstructing the plurality of pictures of the video by decoding the encoded picture data, wherein the method comprises decoding from the encoded video signal a session profile for a video session comprising a plurality of coded video sequences, wherein each of a plurality of video profiles defines at least one tool from a plurality of tools that is needed to decode at least one of the plurality of coded video sequences, wherein the session profile defines at least one tool from the plurality of tools that is needed to decode the plurality of coded video sequences of the video session, wherein reconstructing the plurality of pictures of the video is conducted depending on the session profile, when said computer program is run by a computer.

Another embodiment may have an encoded video signal encoding a picture, wherein the encoded video signal comprises encoded picture data encoding the picture, wherein a video session comprises a plurality of coded video sequences, wherein a CVS profile of a plurality of video profiles is assigned to each coded video sequence of the plurality of coded video sequences, wherein the CVS profile of said coded video sequence defines one or more tools of a plurality of tools that are needed to decode said coded video sequence, wherein each of the plurality of video profiles defines at least one tool that is needed to decode at least one of the plurality of coded video sequences, wherein the session profiles for the video session depends on the CVS profiles of the plurality of coded video sequences of the video session, wherein the encoded video signal comprises an encoding of an indication that indicates the session profile, wherein the session profile comprises all tools of the plurality of tools that are needed to decode all coded video sequences of the video session.

Another embodiment may have a system comprising: the inventive video encoder, and the video decoder for decoding an encoded video signal comprising encoded picture data to reconstruct a plurality of pictures of a video, wherein the video decoder comprises: an input interface configured for receiving the encoded video signal, and a data decoder configured for reconstructing the plurality of pictures of the video by decoding the encoded picture data, wherein the data decoder is configured to decode from the encoded video signal a session profile for a video session comprising a plurality of coded video sequences, wherein each of a plurality of video profiles defines at least one tool from a plurality of tools that is needed to decode at least one of the plurality of coded video sequences, wherein the session profile defines at least one tool from the plurality of tools that is needed to decode the plurality of coded video sequences of the video session, wherein the data decoder is configured to reconstruct the plurality of pictures of the video depending on the session profile, wherein the video encoder configured to generate the encoded video signal, and wherein the video decoder is configured to decode the encoded video signal to reconstruct the picture of the video.

BRIEF DESCRIPTION OF THE DRAWINGS

Embodiments of the present invention will be detailed subsequently referring to the appended drawings, in which:

FIG. 4 illustrates a viewport-dependent tile arrangements with overview.

DETAILED DESCRIPTION OF THE INVENTION

The following description of the figures starts with a presentation of a description of an encoder and a decoder of a block-based predictive codec for coding pictures of a video in order to form an example of a coding framework into which embodiments of the present invention may be built in. The respective encoder and decoder are described with respect to FIG. 9 to FIG. 11. Thereinafter the description of embodiments of the concept of the present invention is presented along with a description as to how such concepts could be built into the encoder and decoder of FIG. 9 and FIG. 10, respectively, although the embodiments described with FIG. 1 to FIG. 3 and following, may also be used to form encoders and decoders not operating according to the coding framework underlying the encoder and decoder of FIG. 9 and FIG. 10.

Figure 9:
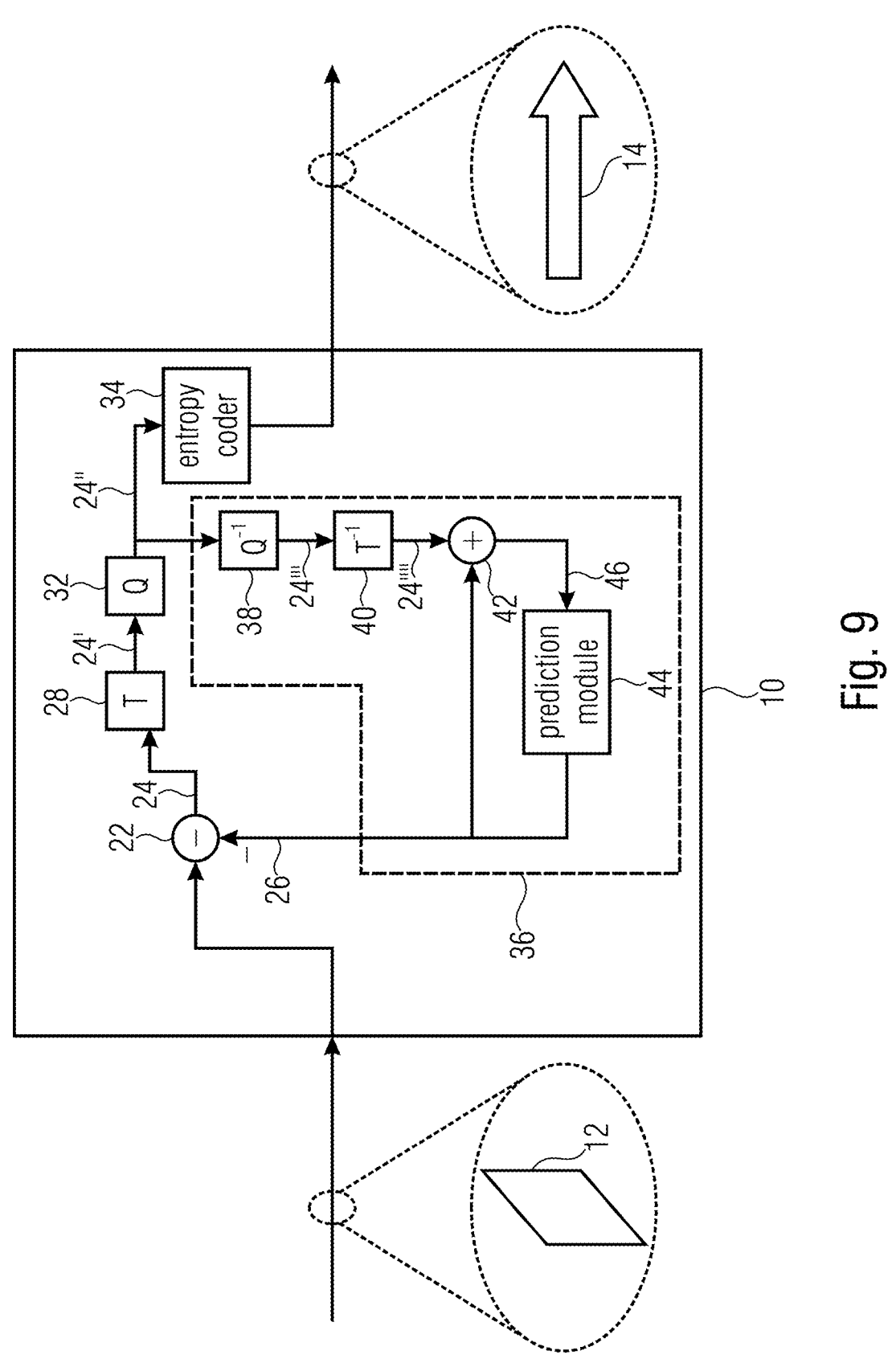
FIG. 9 illustrates a video encoder.
Figure 10:
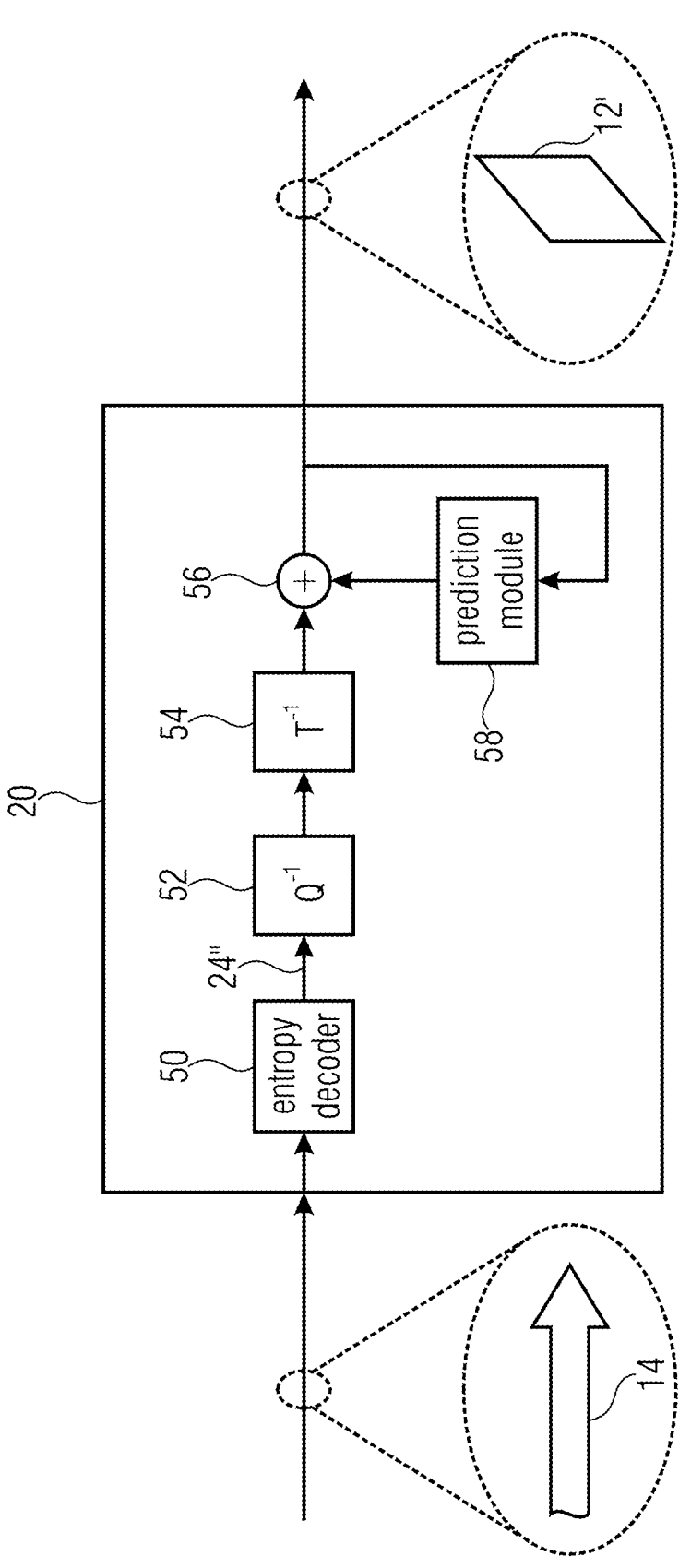
FIG. 10 illustrates a video decoder.

FIG. 9 shows a video encoder, an apparatus for predictively coding a picture 12 into a data stream 14 exemplarily using transform-based residual coding. The apparatus, or encoder, is indicated using reference sign 10. FIG. 10 shows a corresponding video decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 9 and FIG. 10 exemplarily use transform based prediction residual coding, although embodiments of the present application are not restricted to this kind of prediction residual coding. This is true for other details described with respect to FIG. 9 and FIG. 10, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. from the picture 12. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24" encoded into, and decodable from, data stream 14. To this end, the prediction stage 36 may internally, as is shown in FIG. 9, comprise a dequantizer 38 which dequantizes prediction residual signal 24" so as to gain spectral-domain prediction residual signal 24'", which corresponds to signal 24' except for quantization loss, followed by an inverse transformer 40 which subjects the latter prediction residual signal 24'" to an inverse transformation, i.e. a spectral-to-spatial transformation, to obtain prediction residual signal 24"", which corresponds to the original prediction residual signal 24 except for quantization loss. A combiner 42 of the prediction stage 36 then recombines, such as by addition, the prediction signal 26 and the prediction residual signal 24"" so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction.

Likewise, decoder 20, as shown in FIG. 10, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 10, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 11:
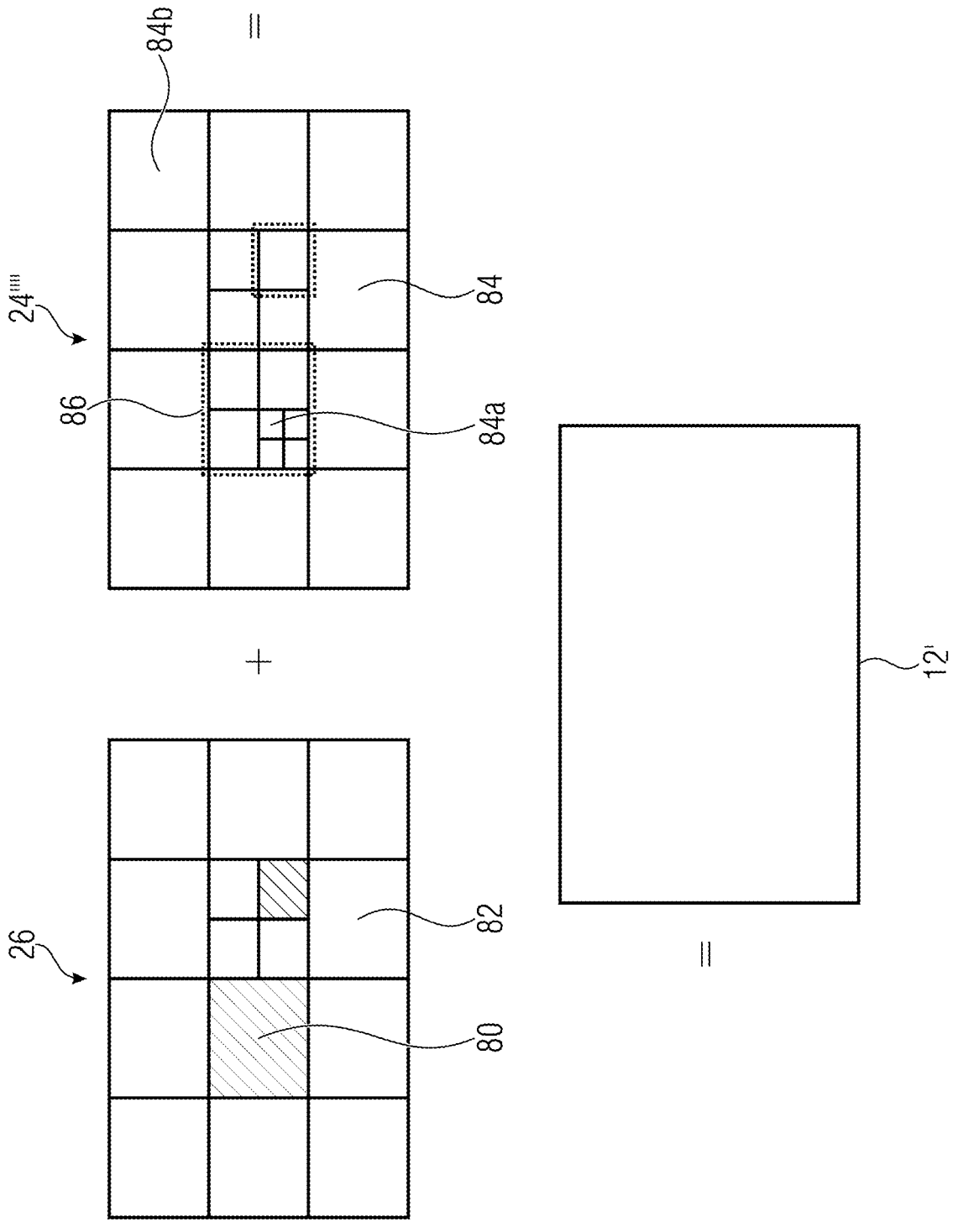
FIG. 11 illustrates the relationship between the reconstructed signal, i.e. the reconstructed picture, on the one hand, and the combination of the prediction residual signal as signaled in the data stream, and the prediction signal, on the other hand.

FIG. 11 illustrates the relationship between the reconstructed signal, i.e. the reconstructed picture 12', on the one hand, and the combination of the prediction residual signal 24"" as signaled in the data stream 14, and the prediction signal 26, on the other hand. As already denoted above, the combination may be an addition. The prediction signal 26 is illustrated in FIG. 11 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 11 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24"" in FIG. 11 is also illustrated as a subdivision of the picture area into blocks 84. These blocks might be called transform blocks in order to distinguish same from the coding blocks 80 and 82. In effect, FIG. 11 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 11 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 11 further illustrates that the combination of the prediction signal 26 and the prediction residual signal 24"" directly results in the reconstructed signal 12'. However, it should be noted that more than one prediction signal 26 may be combined with the prediction residual signal 24"" to result into picture 12' in accordance with alternative embodiments.

In FIG. 11, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform

DST-IV, where DST stands for Discrete Sine Transform

DCT-IV

DST-VII

Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)

Inverse DST-IV

Inverse DCT-IV

Inverse DST-VII

Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform.

As already outlined above, FIG. 9 to FIG. 11 have been presented as an example where the inventive concept described further below may be implemented in order to form specific examples for encoders and decoders according to the present application. Insofar, the encoder and decoder of FIG. 9 and FIG. 10, respectively, may represent possible implementations of the encoders and decoders described herein below. FIG. 9 and FIG. 10 are, however, only examples. An encoder according to embodiments of the present application may, however, perform block-based encoding of a picture 12 using the concept outlined in more detail below and being different from the encoder of FIG. 9 such as, for instance, in that same is no video encoder, but a still picture encoder, in that same does not support inter-prediction, or in that the sub-division into blocks 80 is performed in a manner different than exemplified in FIG. 11. Likewise, decoders according to embodiments of the present application may perform block-based decoding of picture 12' from data stream 14 using the coding concept further outlined below, but may differ, for instance, from the decoder 20 of FIG. 10 in that same is no video decoder, but a still picture decoder, in that same does not support intra-prediction, or in that same sub-divides picture 12' into blocks in a manner different than described with respect to FIG. 11 and/or in that same does not derive the prediction residual from the data stream 14 in transform domain, but in spatial domain, for instance.

In the following, a generic video encoder according to embodiments is described in FIG. 1, a generic video decoder according to embodiments is described in FIG. 2, and a generic system according to embodiments is described in FIG. 3.

Figure 1:
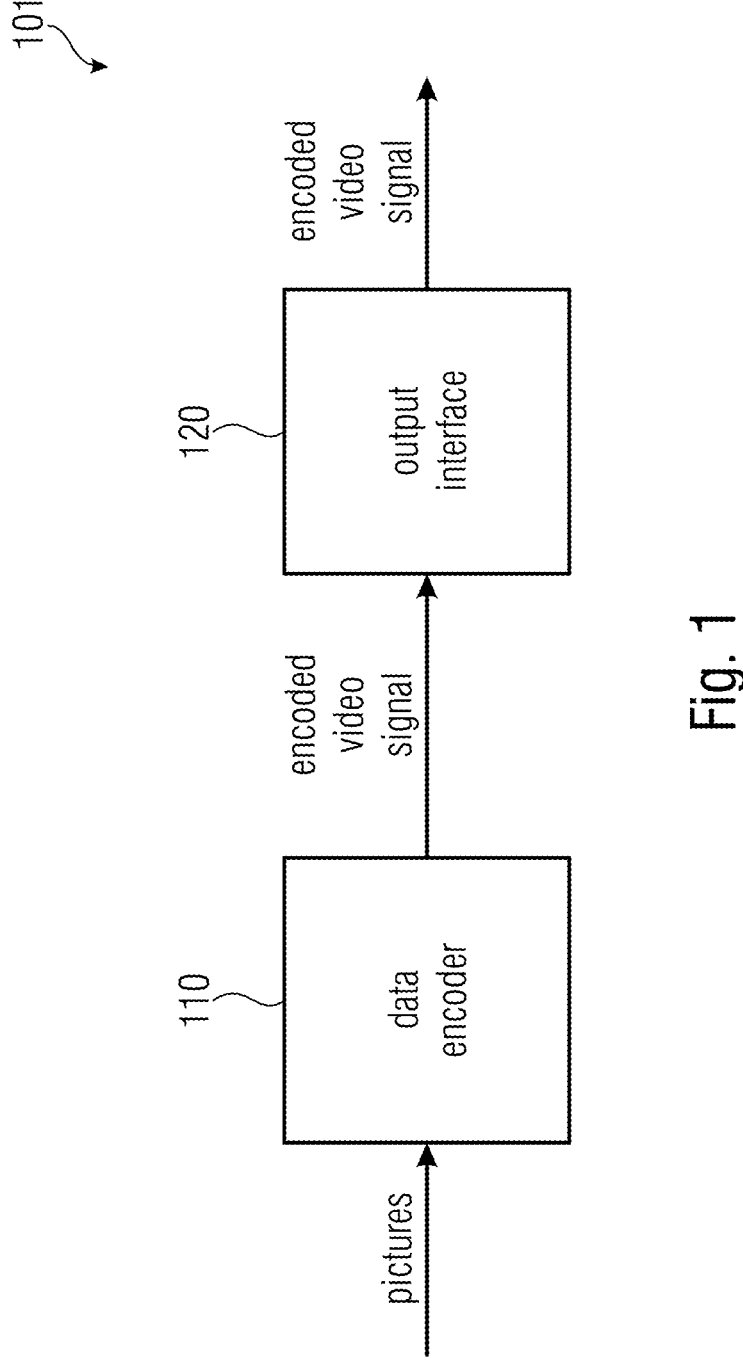
FIG. 1 illustrates a video encoder according to an embodiment.

FIG. 1 illustrates a generic video encoder 101 according to embodiments.

The video encoder 101 is configured for encoding a plurality of pictures of a video by generating an encoded video signal, wherein each of the plurality of pictures comprises original picture data.

The video encoder 101 comprises a data encoder 110 configured for generating the encoded video signal comprising encoded picture data, wherein the data encoder is configured to encode the plurality of pictures of the video into the encoded picture data.

Moreover, the video encoder 101 comprises an output interface 120 configured for outputting the encoded picture data of each of the plurality of pictures.

Figure 2:
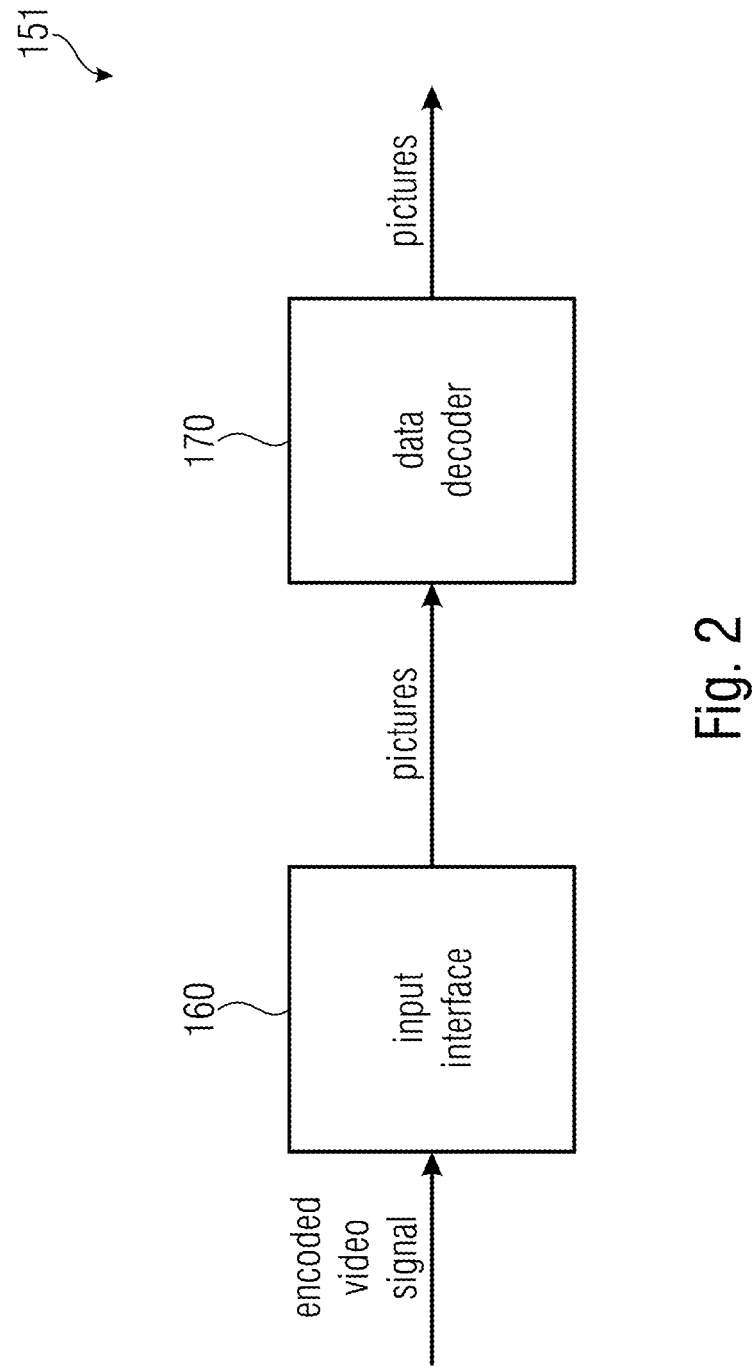
FIG. 2 illustrates a video decoder according to an embodiment.

FIG. 2 illustrates a generic video decoder 151 according to embodiments.

The video decoder 151 is configured for decoding an encoded video signal comprising encoded picture data to reconstruct a plurality of pictures of a video.

The video decoder 151 comprises an input interface 160 configured for receiving the encoded video signal.

Moreover, the video decoder comprises a data decoder 170 configured for reconstructing the plurality of pictures of the video by decoding the encoded picture data.

Figure 3:
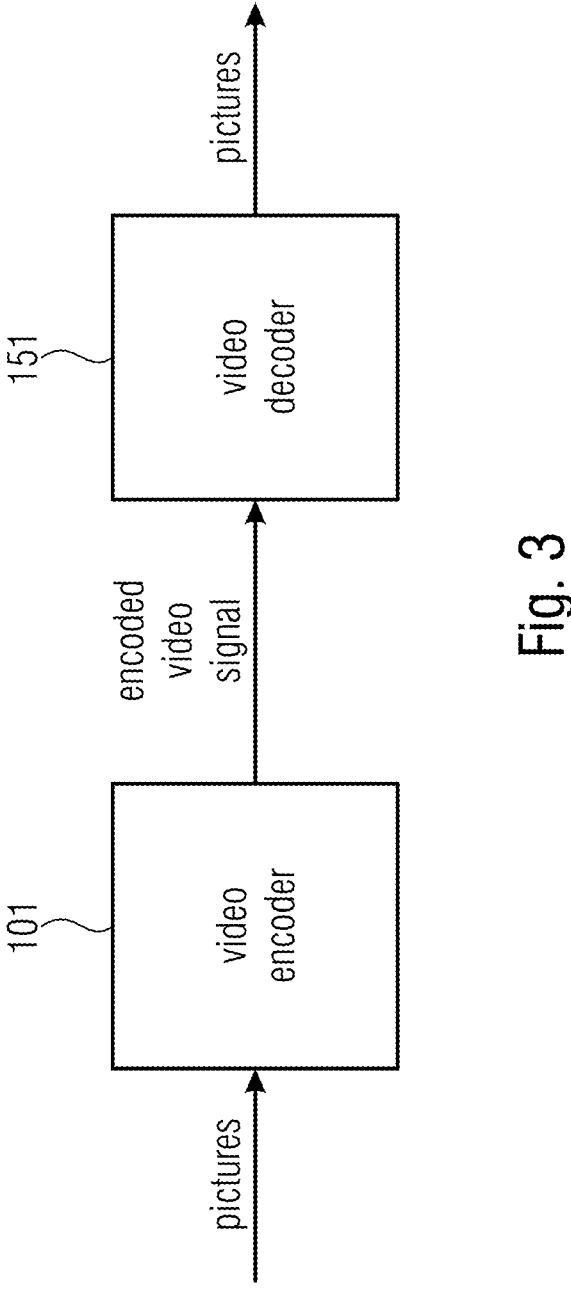
FIG. 3 illustrates a system according to an embodiment.

FIG. 3 illustrates a generic system according to embodiments.

The system comprises the video encoder 101 of FIG. 1 and the video decoder 151 of FIG. 2.

The video encoder 101 is configured to generate the encoded video signal. The video decoder 151 is configured to decode the encoded video signal to reconstruct the picture of the video.

In the following, the first aspect of the invention is now described in detail.

In particular, the first aspect relates to Motion Vector wrap around.

When omnidirectional content is coded using certain projection formats such as the widely deployed ERP format (ERP=Equirectangular Projection), the samples on left and right boundary of the projected picture are actually neighboring in 3d-space after re-projection. In order to leverage this characteristic in state-of-the-art video coding and prevent visual artefacts, the typical process of extrapolating image sample values on the left and right picture boundary is adjusted when motion compensated block-based inter-prediction reaches outside the picture boundary.

Instead of creating the traditional boundary padding sample values through perpendicular extrapolation of the last pixel column on the left and right side of the picture, a clipping operation is used in the derivation of reference sample positions that leads to a would wrap around of motion vectors and reference blocks around a defined sample column as follows $$xInt_i = sps\_ref\_wraparound\_enabled\_flag \quad ?$$
$$ClipH \ ( \quad sps\_ref\_wraparound\_offset, \ picw,$$
$$( \ xInt_L + i - 3 \quad ) \quad ) \quad :$$
$$Clip3 \ ( \quad 0, \ picW - 1, \ xInt_L + i - 3 \quad )$$
$$yInt_i = Clip3 \ ( \quad 0, \ picH - 1, \ yInt_L + i - 3 \quad )$$
$$\text{where } ClipH \ ( \quad o, \ W, \ x \quad ) \text{ is defined as}$$
$$mod \ (x, \ o); \ for \ x < 0$$
$$mod \ ( \ (x - W) \ , \ o) + W - o; \ for \ x > W - 1, \ or$$
$$X; \ otherwise$$

Clip3 is defined in [1] as:

$$Clip3(x, y, z) = \begin{cases} x; & z < x \\ y; & z > y \\ z; & \text{otherwise} \end{cases}$$

A problem arises when such content is further used in omnidirectional video services such as based on the OMAF viewport dependent profile using tiles (OMAF=Omnidirectional Media Format). In such services, a low-resolution variant of the ERP content version is often mixed with other high-resolution fragments of the full content to create a viewport dependent stream. The necessity to arrange fragments of the high-resolution full scene and the low-resolution variant of the content onto a rectangular video frame, may lead to rotation of the low-resolution ERP content, by which the coding cannot leverage the above described characteristic to avoid visual artifacts. For instance, in FIG. 4, two arrangements are showcased that feature a low-resolution ERP overview and high-resolution tiles. It can be seen that the ERP tile is either rotated or neighbored by tiles on the right side.

Therefore, the two tile arrangements illustrated in FIG. 4 pose requirements to the MV wrap around that are not satisfied by the state-of-the-art design.

FIG. 4 illustrates a viewport-dependent tile arrangements with overview according to an embodiment.

According to this aspect, the MV wrap around may, e.g., be adapted in the following ways to allow above tile arrangements. In one embodiment, a signaling sps_ref_wraparound_idc is used to differentiate the MV wrap around options to deal with rotations as in the left-hand side of FIG. 4 as follows:

```
If  (   sps_ref_wraparound_idc = = 0   )
{
    xInt_i = ClipH (   sps_ref_wraparound_offset, picW, (   xInt_L + i − 3   )  )
    yInt_i = Clip3 (   0,  picH − 1,  yInt_L + i − 3   )
}
else if  (   sps_wraparound_idc = = 1   )
{
    xInt_i = Clip3 (   0, picW − 1, xInt_L + i − 3   )
    yInt_i = ClipH (   sps_ref_wraparound_offset_second, picH,   (   yInt_L + i
    − 3   )  )
}
else if  (   sps_wraparound_idc  = = 2   )
{
    xInt_i = ClipH (   sps_ref_wraparound_offset, picW,   (   xInt_L + i − 3   )  )
    yInt_i = Clip3 (   sps_ref_wraparound_offset_second, picH, (   yInt_L + i
    − 3   )  )
{
```

In another embodiment, wrap around regions are defined to cover the scenario depicted on the right-hand side of FIG. 4.

In the following, the second aspect of the invention is now described in detail.

In particular, the second aspect relates to affine prediction runtime costs.

State of the art video codecs are typically designed to cover a broad range of applications, use cases and scenarios. E.g. a codec such as HEVC includes techniques targeted at streaming, broadcast, real-time conversational or surveillance services. Each of those services typically operates at different resolutions that depend on the service constraints: broadcast typically uses higher resolutions than conversational and so on. While the numerous individual tools that a codec comprises are tuned to suit this broad range of associated requirements, there may be losses in efficiency or increased complexity at each individual operation point.

Figure 5:
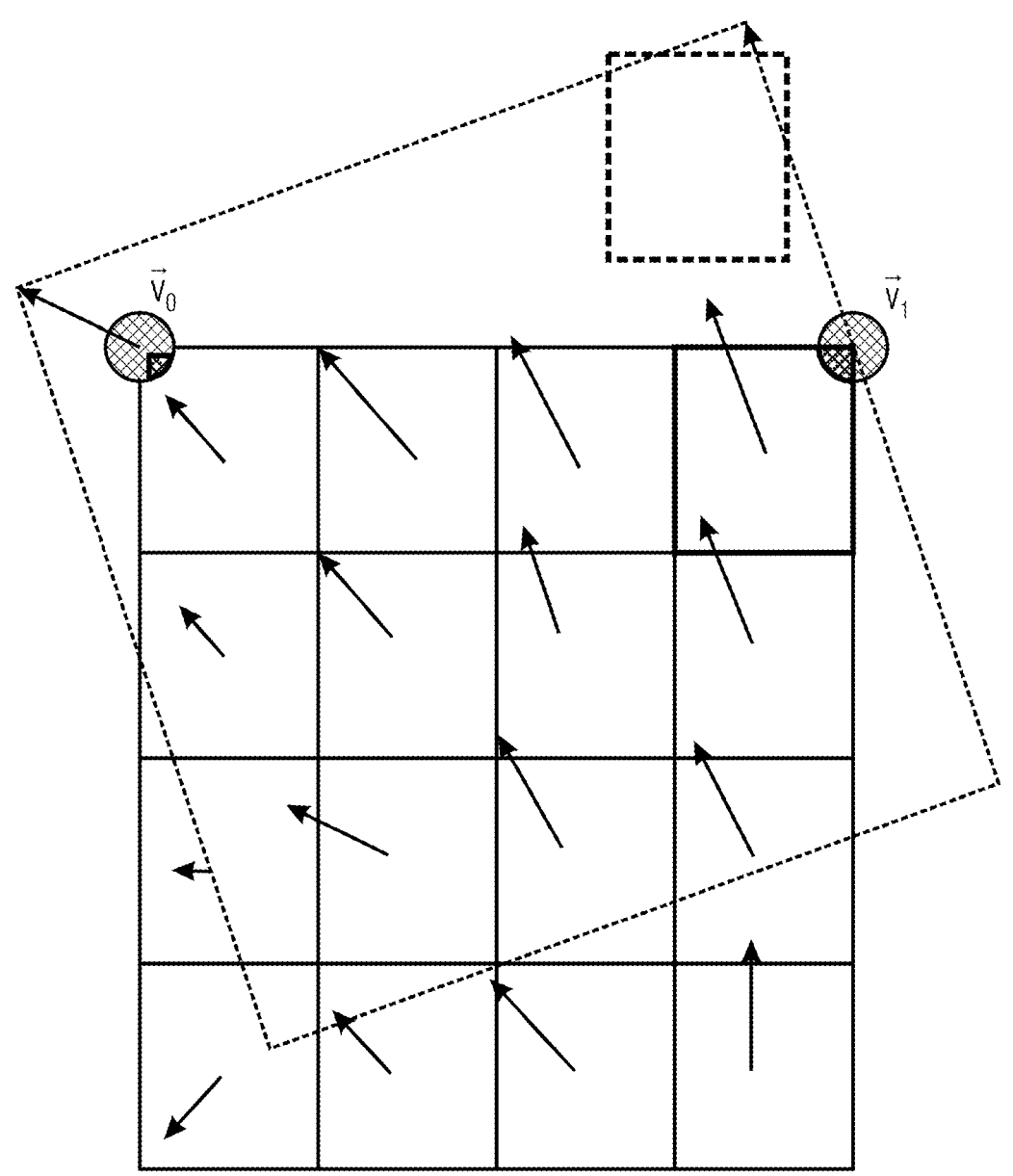
FIG. 5 illustrates affine motion through sub-block divisioning.

For instance, video coding traditionally employs a translation-only motion model, i.e. rectangular blocks are displaced according to a two-dimensional motion vector to form a motion-compensated predictor for the current block. Such a model cannot express rotational or zooming motion that is common in many video sequences and hence, there have been efforts to slightly extent the traditional translational motion model, e.g. as referred to as affine motion in JEM (JEM=Joint Exploration Model). As illustrated in FIG. 5, in this affine motion model, two (or three) so called control point motion vectors per block ($v_0$, $v_1$, . . . ) are used to model rotational and zooming motion. The control point motion vectors are chosen from MV candidates of the adjacent blocks. The resulting motion compensated predictor is derived via computing a sub-block based motion vector field and rely on traditional translational motion compensation of rectangular sub-blocks.

FIG. 5 illustrates affine motion through sub-block divisioning. In particular, FIG. 5 exemplarily illustrates the resulting sub-block reference or predictor (dashed red) for the top-right sub-block (solid red).

While FIG. 5 represents a more or less simple rotational motion, depending on the control point motion vectors, it may happen that the individual sub-block references span over a wide distance in the picture, e.g. such as when representing a zooming motion. In such a case, the resulting sub-block references could be for instance be positioned as illustrated in FIG. 6, exemplarily shown with a smaller block size that results in 2×2 sub-blocks.

Figure 6:
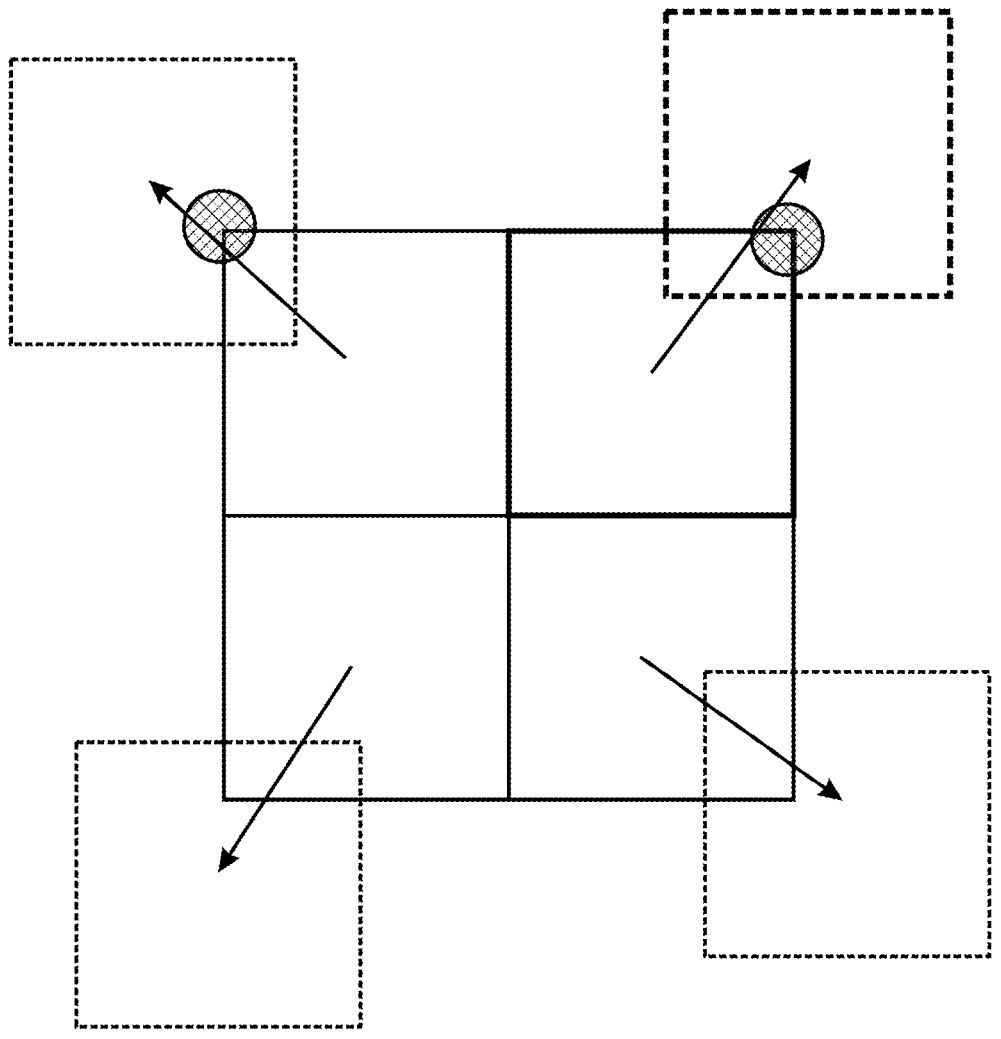
FIG. 6 illustrates zooming motion with affine prediction.

In particular, FIG. 6 illustrates zooming motion with affine prediction.

In such a case, the decoder is required to fetch the individual sub-block references out of a greater total picture area then is covered by the complete current block. In order to cost-efficiently implement such an affine prediction mode, it is required to coordinate fetching of the individual sub-block references on currently available hardware. Such a coordination, can for instance be the joint fetching of the continuous reference picture area that comprises all sub-block references. Hence, extreme zooming motion can be expensive to implement on decoder side as efficient reference fetching strategies are precluded.

In order to limit worst case reference picture access without sacrificing substantial coding gains of the affine prediction mode, approaches are proposed in the state of the art limiting the spread of the predicted block in the reference picture.

According to this aspect, such restrictions may, e.g., be derived depending on the allowed maximal memory bandwidth. This can be either specified in terms of the overall maximal memory bandwidth (e.g. with the specification of the level limit), approximately limiting the memory bandwidth overhead (defining a maximal increase of the required reference memory access relative to usual translational prediction) or explicitly signaled by the encoder in high level parameters. The methods might be mixed.

In one embodiment, the limit on reference sub-block spread is enforced through guaranteeing that a bounding box around the resulting sub-block reference blocks does not exceed a threshold. Such a threshold can be derived from block-size, picture resolution, the maximal allowed bandwidth or explicitly signaled in the high level parameters.

In another embodiment, the limit on reference sub-block spread is dependent on the coded picture resolution or defined by a level limit.

In the following, the third aspect of the invention is now described in detail.

In particular, the third aspect relates to affine prediction chroma handling.

Coding efficiency of the affine prediction model described above is anti-proportional to sub-block size as smaller sub-blocks allow to better approximate the affine motion with the underlying translatory block-based motion model. However, the fine granular reference picture access comes along at significant runtime expense.

When luma and chroma components of a video are unequally sampled, e.g. such as in the predominant consumer video format 4:2:0, prediction/reference blocks are typically sampled in the same ratio. For instance, when a 16×16 luma block is predicted through traditional methods, such as translatory motion compensated block-based prediction, the respective chroma block of 8×8 is predicted using the same luma block motion vector.

In context of the above affine prediction model, as the luma sub-block are already very fine granular or small, the state-of-the-art solution for handling chroma block bases chroma processing on the same luma block size regardless of format subsampling. Hence, 4×4 sub-blocks in the luma channel in affine prediction lead to 4×4 sub-block in the chroma channel which are thereby fewer in number in chroma channels than in luma channels as illustrated in FIG. 7.

Figure 7:
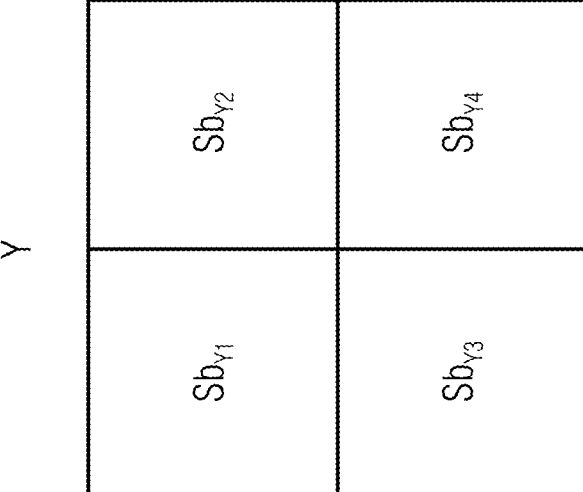
FIG. 7 illustrates sub-block divisioning for affine prediction in different channels.

FIG. 7 illustrates sub-block divisioning for affine prediction in different channels.

Hence, a way to derive the motion information for the corresponding chroma blocks is needed. Different flavors for solutions exists. For instance, the simplest state-of-the-art solution is to average the motion information mvLX[ ] of all four corresponding luma sub-blocks, e.g. as follows:

$$mvAvgLX = ( mvLX[ ( xSbIdx \gg 1 \ll 1) ] [ (ySbIdx \gg 1 \ll 1) ] +$$

$$mvLX[ ( xSbIdx \gg 1 \ll 1) + 1 ] [ ( ySbIdx \gg 1 \ll 1) ] +$$

$$mvLX[ ( xSbIdx \gg 1 \ll 1 ) ] [ ( ySbIdx \gg 1 \ll 1) + 1 ] +$$

$$mvLX[ \{ xSbIdx \gg 1 \ll 1 ) + 1 ] [ (ySbIdx \gg 1 \ll 1) + 1 ] + 2 ) \gg 2$$

Another option is to only average the corresponding top-left and the bottom-right luma motion vector as follows:

$$mvAvgLX = ( mvLX[ ( xSbIdx \gg 1 \ll 1) ] [ (ySbIdx \gg 1 \ll 1) ] +$$

$$mvLX[ ( xSbIdx \gg 1 \ll 1 ) + 1 ] [ (ySbIdx \gg 1 \ll 1) + 1 ] + 1 ) \gg 1$$

Furthermore, symmetric rounding can be introduced as follows:

$$mvAvgLX = ( mvLX[ ( xSbIdx \gg 1 \ll 1) ] [ (ySbIdx \gg 1 \ll 1) ] +$$

$$mvLX[ ( xSbIdx \gg 1 \ll 1 ) + 1 ] [ (ySbIdx \gg 1 \ll 1) + 1 ] )$$

$$mvAvgLX[ 0 ] = ( mvAvgLX[ 0 ] \geq$$

$$0 ? ( mvAvgLX[ 0 ] + 1) \gg 1: -( (- mvAvgLX[ 0 ] + 1 ) \gg 1 ) )$$

$$mvAvgLX[ 1 ] = ( mvAvgLX[ 1 ] \geq$$

$$0 ? ( mvAvgLX[ 1 ] + 1) \gg 1 :- ( (-mvAvgLX[ 1 ] + 1 ) \gg 1 ) )$$

However, a problem arises when chroma formats different from 4:2:0 are used where additional averaging schemes beyond the above state-of-the-art flavors are desirable. For instance, when 4:4:4 chroma format is used, averaging should be avoided as each 4×4 chroma sub-block corresponds to exactly one 4×4 luma sub-block and the 4:2:2 chroma format requires averaging only in one dimension. Hence, according to this aspect, the correct luma blocks to involve in the averaging operation are derived through introducing the chroma subsampling ratio into the derivation of mvAvgLX. In one embodiment the derivation is realized as follows $$mvAvgLX = ( mvLX[ ( xSbIdx \gg SubWidthC \ll SubWidthC) ]$$

$$[ (ySbIdx \gg SubHeightC \ll SubHeightC) ] +$$

$$mvLX[ ( xSbIdx \gg SubWidthC \ll SubWidthC ) + SubWidthC ]$$

$$[ (ySbIdx \gg SubHeightC \ll SubHeightC) + SubHeightC ] )$$

$$mvAvgLX[ 0 ] = ( mvAvgLX[ 0 ] \geq$$

$$0 ?( mvAvgLX[ 0 ] + 1) \gg 1: - ( (-mvAvgLX[ 0 ] + 1 ) \gg 1 ) )$$

$$mvAvgLX[ 1 ] = ( mvAvgLX[ 1 ] \geq$$

$$0 ? (mvAvgLX[ 1 ] + 1) \gg 1 : - ( (-mvAvgLX[ 1 ] + 1 ) \gg 1 ) )$$

where SubWidthC and SubHeightC are derived from the applied chroma format as follows:

| Chroma Format | SubWidthC | SubHeightC |
|---|---|---|
| 4:2:0 | 1 | 1 |
| 4:2:2 | 1 | 0 |
| 4:4:4 | 0 | 0 |

In the following, the fourth aspect of the invention is now described in detail.

In particular, the fourth aspect relates to interpolation filter overhead

Motion compensated inter-prediction can use sample values at sub-sample positions (e.g. half-pel, quarter-pel) which are interpolated through convolutional filters from sample values at integer sample positions. State-of-the-art codecs generally use a fixed tap filter kernel, e.g. 8-tap, to generate such sub-pel sample values.

However, when sub-block based inter-prediction such as affine prediction or DMVR (decoder-side motion vector refinement) lead to relatively small luma and chroma sub-blocks such as of size 4×4, a memory bandwidth problem occurs. With a decreasing (sub-)block size in relation to a fixed interpolation filter size, the overhead in terms of the total number of accessed samples for the generated reference luma sub-pel samples of the (sub-)block increases. Therefore, it has been proposed to use relatively shorter tap filter kernels for sub-pel interpolation of small sub-blocks such as 4×4 which shows a minimal coding penalty that decreases with increasing content resolution.

According to this aspect the selection of shorter tap interpolation filters for sub-pel interpolation is adapted dependent on the resolution of the coded content in order to benefit from the gains in terms of peak memory bandwidth reduction for high resolution content without sacrificing coding efficiency with lower resolution content.

In one embodiment, several sub-pel interpolation filters are available (e.g. bilinear, 4-tap, 6-tap, 8-tap) and the content resolution and block size are used to determine the applicable filter.

An implementation is made more expensive by every increase of the amount of separate filters that need to be implemented and kept at hand in a encoder or decoder. It is therefore advantageous to reduce the amount of separate filters that are to be implemented in parallel in a encoder or decoder.

For instance, it is state-of-the-art that the chroma components of a video signal use spatial subsampling, e.g. when using the 4:2:0 chroma format. In such a case, the chroma component typically also uses a shorter-tap sub-pel-interpolation filter than the luma component. Hence, such shoter-tap sub-pel interpolation filter need to be hold ready by decoder/encoder implementations in addition to the traditional longer-tap sub-pel interpolation filter kernel used for luma components. In an embodiment, a reuse of the shorter-tap sub-pel interpolation filter is introduced in cases where sub-block processing requires a reduced-tap filter for reduction of peak memory bandwidth, e.g. dependent on coded picture size or by encoder choice and bitstream indication.

In the following, the fifth aspect of the invention is now described in detail.

In particular, the fifth aspect relates to bitstream property description and profile set operations Typically, video streams are accompanied by signalling that describes their characteristics and allows identifying the type of capabilities required of a video decoder so that the bitstream can be decoded.

State-of-the-art video coding standards, such as AVC (Advanced Video Coding), HEVC include profiles and level indications into parameter sets in the bitstream that allow identifying which tools need to be supported and e.g. the resolutions limitations of a video coding sequence, so that it can be easily identified whether a decoder can decode a video sequence.

In terms of profiles, one could identify profiles that only support Intra coding tools, or Intra and Inter tools but only 8-bit configurations, or 10-bit configurations, layered or non-layered coding, etc.

In terms of levels (more related to bitrate, resolution and/or framerate) one could differentiate 1080p®30 Hz, 4 Kp®30 Hz, 4 Kp®60 Hz, 8 Kp®30 Hz, etc.

That information is typically used in video streaming systems for capability exchange so that the characteristics are exposed and different receivers can match their capabilities to the requirements to decode the offered bitstreams.

For instance, in DASH (Dynamic Adaptive Streaming over HTTP), the Media Presentation Description (MPD) may comprise several videos offered for the same content with corresponding different parameters. This is done by indicating in an attribute called®codec="xxx" where it is indicated, the codec, profile, level and so on. Similarly, in RTP streaming (RTP=Realtime Transport Protocol) there is a Session Description Protocol (SDP), with which operation points for a session are negotiated. Then, the parties involved in the session agree on which codec, profile and level should be used to establish a session. Also, in Transport Stream, MPEG2-TS (MPEG=Moving Picture Experts Group; TS=Transport Stream) (heavily used in broadcast transmission) there are means to expose this values to the end-device. This is done by including the corresponding video descriptor in a program table that identifies the codec, profile and level of a program (i.e. for instance a TV channel) and thus the adequate channel can be picked that is decodable by the end-device.

Currently, the properties included in the bitstream only apply to a Coded Video Sequence (CVS). A CVS starts with the first IRAP (Intra Random Access Point) and ends with an IRAP that has one the following properties:

It is an IDR (Instantaneous Decoder Refresh)

It is a BLA (Broken Link Access) (only relevant for HEVC)

It has an End Of Sequence (EOS) SEI message (SEI=Supplemental Enhancement Information).

In most of the video services a "session" may comprise several temporally continuous CVSs and therefore the parameters indicated into the parameter sets for AVC and HEVC are not sufficient, since they only describe the first CVS of all of the CVSs involved into the "session". This issue has been solved in MPEG2-TS by the following text:

"NOTE—In one or more sequences in the AVC video stream the level may be lower than the level signalled in the AVC video descriptor, while also a profile may occur that is a subset of the profile signalled in the AVC video descriptor. However, in the entire AVC video stream, only tools shall be used that are included in the profile signalled in the AVC video descriptor, if present. For example, if the main profile is signalled, then the baseline profile may be used in some sequences, but only using those tools that are in the main profile. If the sequence parameter sets in an AVC video stream signal different profiles, and no additional constraints are signalled, then the stream may need examination to determine which profile, if any, the entire stream conforms to. If an AVC video descriptor is to be associated with an AVC video stream that does not conform to a single profile, then the AVC video stream must be partitioned into two or more sub-streams, so that AVC video descriptors can signal a single profile for each such sub-stream."

In other words, the profile and level indicated in the descriptor is a profile that is a superset of any profile used in the CVSs of the AVC video stream and the level is the highest level of any CVS.

In a similar manner, the profile and level indicated in MPD (Media Presentation Description) or SDP can be "higher" (meaning profile superset or more tools required than the profile of each CVS) than the ones in the video bitstreams.

It would be desirable that the bitstreams themselves included such a signalling so that it is clear from the beginning which is the set of required tools to decode all the CVSs of a video "session". (Here, the term video session also, for example, comprises a TV channel program). The signalling consists of a parameter set that applies to several CVSs, i.e. to a bitstream which There are two cases of especial interest:

CVSs with profiles for which there is no profile that is a superset of both at the same time.

CVSs that might change over time with respect to the number of layers.

One option would be to signal all tools required for decoding all CVS with a per tool flag, but this would lead to a non-desirable solution since it is typically more convenient to work based on profiles which are easier to compare than multiple tools which can lead to an extremely high number of combinations.

More than one profile active within a bitstream could lead to the four following case. The tools needed to decode the bitstream correspond to:

The intersection of two profiles, where no profile exist that corresponds to the intersection.

The intersection of two profiles, where one profile is the intersection of two profiles.

The union of two profiles, where no profile exists that corresponds to the intersection.

The union of two profiles, where a profile exists that corresponds to the intersection.

For the cases that there is a profile that corresponds to all tools needed, a single profile indication would be enough.

However, for the case that no profile exists to describe all tools necessary, more than one profile should be signalled and intersection or union should be signalled to indicate whether supporting of a single profile is enough to decode the bitstream (intersection) or both profiles need to be supported to be able to decode the bitstream.

In the following, the sixth aspect of the invention is now described in detail.

In particular, the sixth aspect relates to buffering Period SEI and Picture Timing SEI message parsing dependencies In existing designs like HEVC, syntax elements in Buffering Period SEI message (SEI=Supplemental Enhancement Information), Picture Timing SEI message and Decoding Unit SEI message depend on syntax elements that are carried in the SPS (Sequence Parameter Set). This dependency includes the number of bits which are used to code specific syntax elements and also presence of syntax elements.

However, it is not desirable to put all Buffering Period/Picture Timing/Decoding Unit related information into the same syntax location because:

1) Syntax elements currently in the SPS are useful for session/capability negotiation, which is done by exchanging parameter sets. Thus they cannot solely be singalled in the Buffering Period SEI message.

2) Syntax elements in the Buffering Period SEI message cannot be moved to the SPS, because activating a new SPS is only possible at IRAP pictures (IRAP=Intra Random Access Point), while Buffering Periods can start at any picture associated with temporal sublayer 0. It is also undesirable to require activation of new parameter sets at every buffering period.

The above parsing dependency leads to a startup problem: Before the first VCL NAL unit of the video bitsream is parsed, there is no active SPS. Since SEI messages are sent before the first VCL NAL unit (NAL=network abstraction layer), they will arrive before the SPS is activated.

Also, in out-of-band signaling of parameter sets, a in-the-middle device such as a splicer interested in understanding the HRD parameters of a bitstream, e.g. for splicing bitstreams, may not be able to parse the respective SEI messages, because the relate parameter sets are not included in the bitstream.

Also for a simple in-the-middle device such as a splicer it may be hard to parse through the whole SPS until it reaches the HRD parameters in VUI.

Figure 8:
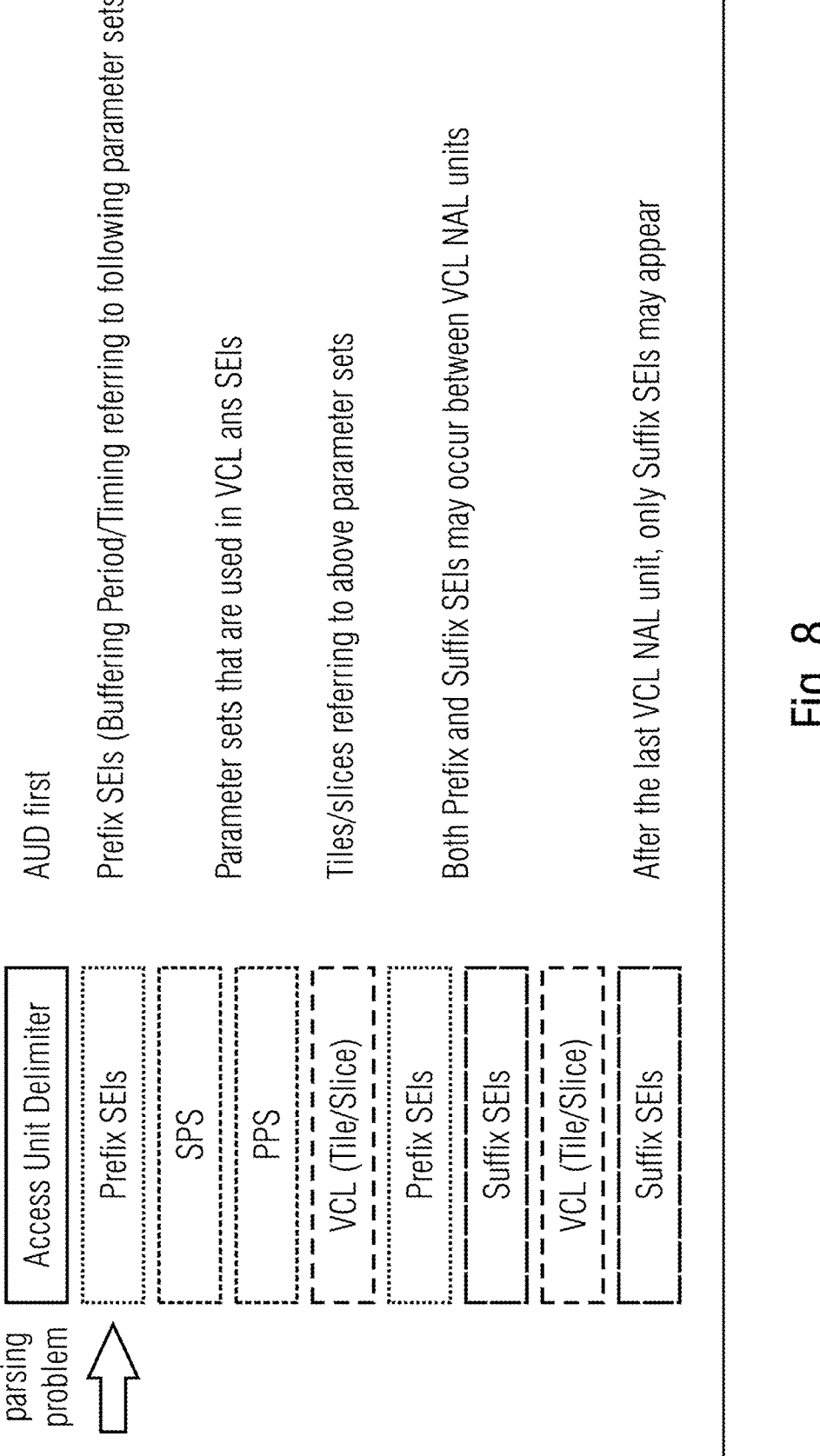
FIG. 8 shows a state-of-the art example bitstream order for such a case.

Also, the order of NAL units is not explicitly constrained to require the SPS to be send before the Buffering Period SEI message that refers to the SPS. In such situations, a decoder may have to store the respective SEI messages in bitstream format (without being able to parse it), until the SPS arrives and is activated. Only then, the SEI messages can be parsed. FIG. 8 shows a state-of-the art example bitstream order for such a case.

In an embodiment, parsing of the respective SEI messages is made independent of the SPS in the following way:

All syntax elements, which specify the length of another syntax element in the respective SEI messages, or are not required for session/capability negotiation (subpicture clock tick divisor) are moved into the Buffering Period SEI message.

The length of all syntax elements in the Buffering Period SEI is completeley independent of other syntax structures. The length of syntax elements in the Timing SEI message and Decoding Unit SEI message may be dependent on syntax elements in the Buffering Period SEI message, but not dependent on any parameter set values.

The presence flags for specific HRD parameters (NAL, VCL, DU, etc.), the count of CPB parameters (vui_cpb_cnt_minus1[i] and bp_cpb_cnt_minus1) and other syntax sections are duplicated in parameter sets and the Buffering Period SEI message, and this aspect comprises to constrain the value of these duplicated syntax elements to be equal in both locations.

Picture Timing SEI message and Decoding Unit SEI message are made independent by moving all syntax elements, that indicate presence of other syntax elements into the respective SEI messages (e.g. frame_field_info_present_flag), or duplicating it.

As part of this aspect, to achieve bitstream conformance, the values of above syntax elements shall be equal to the respective values in the parameter sets.

As part of this aspect, tick_devisors (indicating the subpicture timing granularity) in buffering periods are to have the same value unless concatenation_flag is equal to 1 (i.e. splicing occurred).

As already outlined, in embodiments, it is proposed to add HRD parameters, Buffering Period, Picture Timing, and Decoding Unit information SEI messages to the VVC specification. General syntax and semantics are based on the corresponding HEVC structures. Parsing of SEI messages is made possible independent of the presence of the SPS.

As outlined above, for checking bitstream conformance, a buffering model is required. The VVC buffering model may, e.g., be based on the Hypothetical Reference Decoder (HRD) specification that was used in HEVC with some simplifications.

HRD parameters are present in the SPS VUI. Buffering Period SEI, Picture Timing SEI and Decoding Unit information SEI messages were added to the Access Units that they referred to.

In HEVC a parsing dependency exists between SPS and the HRD related SEI messages. Although the semantics allowed only referring to a SPS that is active in the same Access unit, the bitstream order allowed situations, where a SEI could arrive before the SPS. In such cases the coded SEI messages needed to be stored until the correct SPS arrives.

Another situation, in which this parsing dependency is problematic, are network elements and splicers, especially, when parameter sets are exchanged out of band (e.g. in session negotiation). In such cases, the parameter sets may not be included in the bitstream at all, so that the network element or splicer could not decode the buffering/timing information at all. It still may be interesting to these elements, to recognize values like decoding times and frame/field information.

In embodiments, it is proposed to make parsing of Buffering Period, Picture Timing, and Decoding Unit information SEI messages independent from the SPS VUI/HRD parameters by:

Moving all syntax elements that indicate the length or presence of other syntax elements from VUI into the Buffering Period SEI message.#

Duplicating syntax elements, that are required in both locations. The values of these syntax elements are constrained to be identical.

Design Decisions

Not all syntax elements should be moved from VUI to the Buffering Period SEI, since parameter sets are usually exchanged for session negotiation. So parameters that are important for session negotiation are kept in VUI.

Moving all Buffering Period parameters into SPS is not possible, since Buffering Periods may start at non-IRAP pictures, where activating a new SPS would not be possible.

A dependency between Buffering Period SEI and (Picture Timing SEI or Decoding Unit SEI) is not considered harmful, because there is also a logical dependency between these messages.

A syntax example based on HEVC syntax is given below.

The following syntax diagrams are based on the HEVC syntax with changes marked with underline to show addition and strike through to show deletion. Semantics are generally moved to the new locations of the syntax elements (with adaptation to the syntax element name). Whenever syntax elements are duplicated, a bitstream constraint is added that these syntax elements shall have the same value.

VUI/HRD Parameters

```
...
vui_frame_field_info_present_flag

...
  vui_timing_info_present_flag                                                         u(1)
  if( vui_timing_info_present_flag ) {
    vui_num_units_in_tick                                                              u(32)
    vui_time_scale                                                                     u(32)
    vui_poc_proportional_to_timing_flag                                                u(1)
    if( vui_poc_proportional_to_timing_flag )
      vui_num_ticks_poc_diff_one_minus1                                                ue(v)
    vui_hrd_parameters_present_flag                                                    u(1)
    if( vui_hrd_parameters_present_flag )
      hrd_parameters( 1, sps_max_sub_layers_minus1 )
  }
...                                                                                    u(1)
hrd_parameters( commonInfPresentFlag, maxNumSubLayersMinus1 ) {               Descriptor
  if( commonInfPresentFlag ) {
    vui_nal_hrd_parameters_present_flag                                                u(1)
    vui_vcl_hrd_parameters_present_flag                                                u(1)
    if( vui_nal_hrd_parameters_present_flag | | vui_vcl_hrd_parameters_present_flag ) {
      vui_sub_pic_hrd_params_present_flag                                              u(1)
        if( sub_pic_hrd_params_present_flag ) {
          tick_divisor_minus2                                                          u(8)
          du_cpb_removal_delay_increment_length_minus1                                 u(5)
          sub_pic_cpb_params_in_pic_timing_sei_flag                                    u(1)
          dpb_output_delay_du_length_minus1                                            u(5)
        }
      bit_rate_scale                                                                   u(4)
      cpb_size_scale                                                                   u(4)
      if( vui_sub_pic_hrd_params_present_flag)
        cpb_size_du_scale                                                              u(4)
      initial_cpb_removal_delay_length_minus1                                          u(5)
      au_cpb_removal_delay_length_minus1                                               u(5)
      dpb_output_delay_length_minus1                                                   u(5)
    }
  }
  for( i = 0; i <= maxNumSubLayersMinus1; i++) {
    fixed_pic_rate_general_flag[ i ]                                                   u(1)
    if( !fixed_pic_rate_general_flag[ i ] )
      fixed_pic_rate_within_cvs_flag[ i ]                                              u(1)
    if( fixed_pic_rate_within_cvs_flag[ i ] )
      elemental_duration_in_tc_minus1[ i ]                                             ue(v)
    else
      low_delay_hrd_flag[ i ]                                                          u(1)
    if( !low_delay_hrd_flag[ i ] )
      vui_cpb_cnt_minus1[ i ]                                                          ue(v)
    if( nal_hrd_parameters_present_flag)
      sub_layer_hrd_parameters( i )
    if( vcl_hrd_parameters_present_flag)
      sub_layer_hrd_parameters( i )
  }
}
```

Buffering Period SEI Message

```
buffering_period( payloadSize ) {
  bp_seq_parameter_set_id
  bd_nal_hrd_parameters_present_flag
  bd_vcl_hrd_parameters_present_flag
  if(bp_nal_hrd_parameters_present_flag | | bp_vcl_hrd_parameters_present_flag ) {
    bp_sub_pic_hrd_params_present_flag
    if(bp_sub_pic_hrd_params_present_flag ) {
      tick_divisor_minus2
      du_cpb_removal_delay_increment_length_minus1
      sub_pic_cpb_parens_in_pic_timing_sei_flag
      dpb_output_delay_du_length_minus1
    }
```

-continued

```
        initial_cpb_removal_delay_length_minus1
        au_cpb_removal_delay_length_minus1
        dpb_output_delay_length_minus1
    }
    if( !bp_sub_pic_hrd_params_present_flag )
        irap_cpb_params_present_flag
    if( irap_cpb_params_present_flag ) {
        cpb_delay_offset
        dpb_delay_offset
    }
    concatenation_flag
    au_cpb_removal_delay_delta_minus1
    bp_cpb_cnt_minus1
    if(bp_nal_hrd_parameters_present_flag NalHrdBpPresentFlag )) {
        for( i = 0; i < bp_cpb_cnt_minus1 + 1   ) {
        nal_initial_cpb_removal_delay[ i ]
        nal_initial_cpb_removal_offset[ i ]
        if( sub_pic_hrd_params_present_flag | | irap_cpb_params_present_flag ) {
            nal_initial_alt_cpb_removal_delay[ i ]
            nal_initial_alt_cpb_removal_offset[ i ]
        }
      }
    }
    if(bp_vcl_hrd_parameters_present_flag CpbCnt; i++ )) {
        for( i = 0; i < bp_cpb_cnt_minus1 + 1 CpbCnt i++ ) {
        vcl_initial_cpb_removal_delay[ i ]
        vcl_initial_cpb removal_offset[ i ]
        if( sub_pic_hrd_params_present_flag | | irap_cpb_params_present_flag ) {
            vcl_initial_alt_cpb_removal_delay[ i ]
            vcl_initial_alt_cpb_removal_offset[ i ]
        }
      }
    }
    if( payload_extension_present( ) )
        use_alt_cpb_params_flag
}
```

Picture Timing SEI Message

| | Descriptor |
|---|---|
| pic_timing( payloadSize ) { | |
|   frame_field_into_present_flag | |
|   if( frame_field_info_present_flag) { | |
|     pic_struct | u(4) |
|     source_scan_type | u(2) |
|     duplicate_flag | u(1) |
|   } | |
|   if( CpbDpbDelaysPresentFlag ) { | |
|     au_cpb_removal_delay_minus1 | u(v) |
|     pic_dpb_output_delay | u(v) |
|     if( sub_pic_hrd_params_present_flag ) | |
|       pic_dpb_output_du_delay | u(v) |
|     if(           sub_pic_hrd_params_present_flag && | |
|     sub_pic_cpb_params_in_pic_timing_sei_flag ) { | |
|       num_decoding_units_minus1 | ue(v) |
|       du_common_cpb_removal_delay_flag | u(1) |
|       if( du_common_cpb_removal_delay_flag) | |
|         du_common_cpb_removal_delay_increment_minus1 | u(v) |
|       for( i = 0; i <= num_decoding_units_minus1; i++ ) { | |
|         num_nalus_in_du_minus1[ i ] | ue(v) |
|         if( !du_common_cpb_removal_delay_flag && i < | |
|       num_decoding_units_minus1 ) | |
|           du_cpb_removal_delay_increment_minus1[ i ] | u(v) |
|       } | |
|     } | |
|   } | |
| } | |

Decoding Unit Information SEI Message

| | Descriptor |
|---|---|
| decoding_unit_info( payloadSize ) { | |
|    decoding_unit_idx | ue(v) |
|    if( !sub_pic_cpb_params_in_pic_timing_sei_flag ) | |
|      du_spt_cpb_removal_delay_increment | u(v) |
|    dpb_output_du_delay_present_flag | u(1) |
|    if( dpb_output_du_delay_present_flag ) | |
|      pic_spt_dpb_output_du_delay | u(v) |
| } | |

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] ISO/IEC, ITU-T. High efficiency video coding. ITU-T Recommendation H.265|ISO/IEC 23008 10 (HEVC), edition 1, 2013; edition 2, 2014.

The invention claimed is:

1. A method for decoding a picture from a data stream, the method comprising:

decoding, from the data stream, a chroma format information describing how chroma of the picture is sampled;

determining a motion vector corresponding to a chroma subblock of the picture, wherein:

in response to the chroma format information indicating that the chroma subblock is sampled in a 4:4:4 format, determining the motion vector corresponding to the chroma subblock based on motion vector information corresponding to one luma subblock, in response to the chroma format information indicating that the chroma subblock is sampled in a 4:2:2 format, determining the motion vector corresponding to the chroma subblock based on averaging motion vector information corresponding to two luma subblocks in one dimension, and in response to the chroma format information indicating that the chroma subblock is sampled in a 4:2:0 format: determining the motion vector corresponding to the chroma subblock based on (i) selecting a top-left luma subblock and a bottom-right luma subblock and (ii) averaging motion vector information corresponding to the selected luma subblocks; and reconstructing the picture based in part on the determined motion vector corresponding to the chroma subblock.

2. The method of claim 1, wherein averaging the motion vector information corresponding to the selected luma subblocks when the chroma subblock is sampled in the 4:2:0 format further comprises:

performing symmetric rounding of the motion vector information corresponding to the selected luma subblocks.

3. The method of claim 1, wherein in response to the chroma format information indicating that the chroma subblock is sampled in the 4:2:2 format or the 4:2:0 format, the method further comprises:

deriving, based on the chroma format information, a subWidthC chroma format parameter and a subHeightC chroma format parameter;

selecting two luma subblocks based on the subWidthC chroma format parameter and the subHeightC chroma format parameter; and averaging the motion vector information corresponding to the selected two luma subblocks.

4. The method of claim 1, further comprising:

deriving, based on the chroma format information, a subWidthC chroma format parameter and a subHeightC chroma format parameter; and determining that the chroma subblock is sampled in the 4:2:2 format when the subWidthC chroma format parameter and the subHeightC chroma format parameter are different values.

5. An electronic device for decoding a picture from a data stream, the electronic device comprising:

a processor including processing circuitry configured to:

decode, from the data stream, a chroma format information describing how chroma of the picture is sampled;

determine a motion vector corresponding to a chroma subblock of the picture, wherein:

in response to the chroma format information indicating that the chroma subblock is sampled in a 4:4:4 format, the processor is configured to determine the motion vector corresponding to the chroma subblock based on motion vector information corresponding to one luma subblock, in response to the chroma format information indicating that the chroma subblock is sampled in a 4:2:2 format, the processor is configured to determine the motion vector corresponding to the chroma subblock based on averaging motion vector information corresponding to two luma subblocks in one dimension, and in response to the chroma format information indicating that the chroma subblock is sampled in a 4:2:0 format, the processor is configured to determine the motion vector corresponding to the chroma subblock based on (i) selecting a top-left luma subblock and a bottom-right luma subblock and (ii) averaging motion vector information corresponding to the selected luma subblocks; and reconstruct the picture based in part on the determined motion vector corresponding to the chroma subblock.

6. The electronic device of claim 5, wherein to average the motion vector information corresponding to the selected luma subblocks when the chroma subblock is sampled in the 4:2:0 format, the processor is configured to:

perform symmetric rounding of the motion vector information corresponding to the selected luma subblocks.

7. The electronic device of claim 5, wherein in response to the chroma format information indicating that the chroma subblock is sampled in the 4:2:2 format or the 4:2:0 format, the processor is configured to:

derive, based on the chroma format information, a subWidthC chroma format parameter and a subHeightC chroma format parameter;

select two luma subblocks based on the subWidthC chroma format parameter and the subHeightC chroma format parameter; and average the motion vector information corresponding to the selected two luma subblocks.

8. The electronic device of claim 5, wherein the processor is further configured to:

derive, based on the chroma format information, a subWidthC chroma format parameter and a subHeightC chroma format parameter; and determine that the chroma subblock is sampled in the 4:2:2 format when the subWidthC chroma format parameter and the subHeightC chroma format parameter are different values.

9. A non-transitory digital storage medium containing instructions, that when executed by a processor of an electronic device, cause the electronic device to:

decode, from a data stream, a chroma format information describing how chroma of a picture is sampled;

determine a motion vector corresponding to a chroma subblock of the picture, wherein:

in response to the chroma format information indicating that the chroma subblock is sampled in a 4:4:4 format, the processor is configured to determine the motion vector corresponding to the chroma subblock based on motion vector information corresponding to one luma subblock, in response to the chroma format information indicating that the chroma subblock is sampled in a 4:2:2 format, the processor is configured to determine the motion vector corresponding to the chroma subblock based on averaging motion vector information corresponding to two luma subblocks in one dimension, and in response to the chroma format information indicating that the chroma subblock is sampled in a 4:2:0 format, the processor is configured to determine the motion vector corresponding to the chroma subblock based on (i) selecting a top-left luma subblock and a bottom-right luma subblock and (ii) averaging motion vector information corresponding to the selected luma subblocks; and reconstruct the picture based in part on the determined motion vector corresponding to the chroma subblock.

10. A method for encoding a picture to a data stream, the method comprising:

encoding, into the data stream, a chroma format describing how chroma of the picture is sampled;

determining a motion vector corresponding to a chroma subblock of the picture, wherein:

in response to the chroma format being a 4:4:4 format, determining the motion vector corresponding to the chroma subblock based on motion vector information corresponding to one luma subblock, in response to the chroma format being a 4:2:2 format, determining the motion vector corresponding to the chroma subblock based on averaging motion vector information corresponding to two luma subblocks in one dimension, and in response to the chroma format being a 4:2:0 format, determining the motion vector corresponding to the chroma subblock based on (i) selecting a top-left luma subblock and a bottom-right luma subblock and (ii) averaging motion vector information corresponding to the selected luma subblocks; and reconstructing the picture based in part on the motion vector corresponding to the chroma subblock.

11. An electronic device for encoding a picture to a data stream, the electronic device comprising:

a processor including processing circuitry configured to:

encode, into the data stream, a chroma format describing how chroma of the picture is sampled;

determine a motion vector corresponding to a chroma subblock of the picture, wherein:

in response to the chroma format being a 4:4:4 format, determine the motion vector corresponding to the chroma subblock based on motion vector information corresponding to one luma subblock, in response to the chroma format being a 4:2:2 format, determine the motion vector corresponding to the chroma subblock based on averaging motion vector information corresponding to two luma subblocks in one dimension, and in response to the chroma format being a 4:2:0 format, determine the motion vector corresponding to the chroma subblock based on (i) selecting a top-left luma subblock and a bottom-right luma subblock and (ii) averaging motion vector information corresponding to the selected luma subblocks to determine the motion vector corresponding to the chroma subblock; and reconstruct the picture based in part on the motion vector corresponding to the chroma subblock.

12. A non-transitory digital storage medium containing instructions, that when executed by a processor of an electronic device, cause the electronic device to:

encode, into a data stream, a chroma format describing how chroma of a picture is sampled;

determine a motion vector corresponding to a chroma subblock of the picture, wherein:

in response to the chroma format being a 4:4:4 format, determine the motion vector corresponding to the chroma subblock based on motion vector information corresponding to one luma subblock, in response to the chroma format being a 4:2:2 format, determine the motion vector corresponding to the chroma subblock based on averaging motion vector information corresponding to two luma subblocks in one dimension, and in response to the chroma format being a 4:2:0 format, determine the motion vector corresponding to the chroma subblock based on (i) selecting a top-left luma subblock and a bottom-right luma subblock and (ii) averaging motion vector information corresponding to the selected luma subblocks to determine the motion vector corresponding to the chroma subblock; and reconstruct the picture based in part on the motion vector corresponding to the chroma subblock.

* * * * *